US011753154B2

(12) United States Patent
Misiorowski et al.

(10) Patent No.: US 11,753,154 B2
(45) Date of Patent: Sep. 12, 2023

(54) TILT ROTOR AIRCRAFT NOISE REDUCTION

(71) Applicant: Bell Textron Inc., Fort Worth, TX (US)

(72) Inventors: Matthew P. Misiorowski, Arlington, TX (US); Joseph H. Schmaus, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 15 days.

(21) Appl. No.: 17/370,817

(22) Filed: Jul. 8, 2021

(65) Prior Publication Data

US 2023/0009101 A1    Jan. 12, 2023

(51) Int. Cl.
*B64C 27/605* (2006.01)
*B64C 27/00* (2006.01)
*B64C 29/00* (2006.01)

(52) U.S. Cl.
CPC .......... *B64C 27/001* (2013.01); *B64C 27/605* (2013.01); *B64C 29/0033* (2013.01)

(58) Field of Classification Search
CPC .. B64C 27/001; B64C 27/605; B64C 29/0033
See application file for complete search history.

(56) References Cited

U.S. PATENT DOCUMENTS

| | | | | |
|---|---|---|---|---|
| 4,946,354 A | * | 8/1990 | Aubry | B64C 27/72 416/157 A |
| 6,671,590 B1 | * | 12/2003 | Betzina | B64C 27/001 701/3 |
| 2002/0134883 A1 | * | 9/2002 | Stamps | B64C 29/0033 244/7 R |
| 2008/0253891 A1 | * | 10/2008 | Cabrera | B64C 27/605 416/134 A |
| 2018/0141654 A1 | * | 5/2018 | Choi | B64C 27/28 |

* cited by examiner

*Primary Examiner* — Tye William Abell
(74) *Attorney, Agent, or Firm* — Frost Brown Todd LLP (57) ABSTRACT

A control system for a multi-rotor aircraft is described that results in lower operating noise. Allowing blades to flap during flight reduces aerodynamic interference as blades pass by other aircraft components, such as wings or the fuselage. Pitch links coupled to a rotational swashplate can be used to allow flapping during flight. The swashplates can allow the canting of the rotors to change a rotational or out-of-plane angle of the blades to decrease noise.

19 Claims, 10 Drawing Sheets

TILT ROTOR AIRCRAFT NOISE REDUCTION

TECHNICAL FIELD

The present disclosure is directed to multi-rotor aircraft.

BACKGROUND OF THE INVENTION

Tilt rotor aircraft have advantages over other aircraft in numerous situations. They can both take off vertically, like a helicopter, and fly forward like an airplane. Tilt rotors may become more common as air taxis achieve more widespread use. If there are more aircraft in the sky around a city, the noise levels may become a problem.

BRIEF SUMMARY OF THE INVENTION

One embodiment under the present disclosure is a control system for a tilt rotor aircraft, comprising: two or more rotors each configured to rotate two or more blades; a stationary swashplate on each of the two or more rotors, the stationary swashplate coupled to two or more control inputs and configured to be stationary relative to the two or more rotors, the two or more control inputs operable to adjust an angle of the stationary swashplate; a rotational swashplate on each of the two or more rotors and located above the stationary swashplate, each rotational swashplate coupled to the two or more blades by two or more pitch links, each rotational swashplate configured to rotate with the two or more rotors, the two or more pitch links configured to adjust a pitch angle of the two or more blades; and a computing device operable to receive input from one or more users, to manipulate the two or more control inputs, to manipulate the two or more pitch links, and to manipulate the two or more pitch links to allow the two or more blades to flap during at least a portion of a flight.

Another embodiment is a multi-rotor aircraft comprising: a fuselage; two or more rotors coupled to the fuselage; two or more blades coupled to each rotor and configured to be rotated by the two or more rotors; a stationary swashplate on each of the two or more rotors, the stationary swashplate coupled to two or more control inputs and configured to be stationary relative to the rotation of the two or more rotors, the two or more control inputs operable to adjust an angle of the stationary swashplate and thereby adjust an out-of-plane angle of the two or more blades; a rotational swashplate on each of the two or more rotors located above the stationary swashplate, each rotational swashplate coupled to the two or more blades by two or more pitch links, each rotational swashplate configured to rotate with the two or more blades, the two or more pitch links configured to adjust a pitch angle of the two or more blades; and a computing device operable to receive input from one or more users, to manipulate the two or more control inputs, to manipulate the two or more pitch links, and to manipulate the two or more pitch links to allow the two or more blades to flap during at least a portion of a flight.

Another embodiment is a method of controlling a multi-rotor aircraft, comprising: receiving, by an aircraft control system, a request for noise reduction; and allowing, by the aircraft control system, two or more blades to flap during at least a portion of a flight, the two or more blades coupled to two or more rotors.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1A:
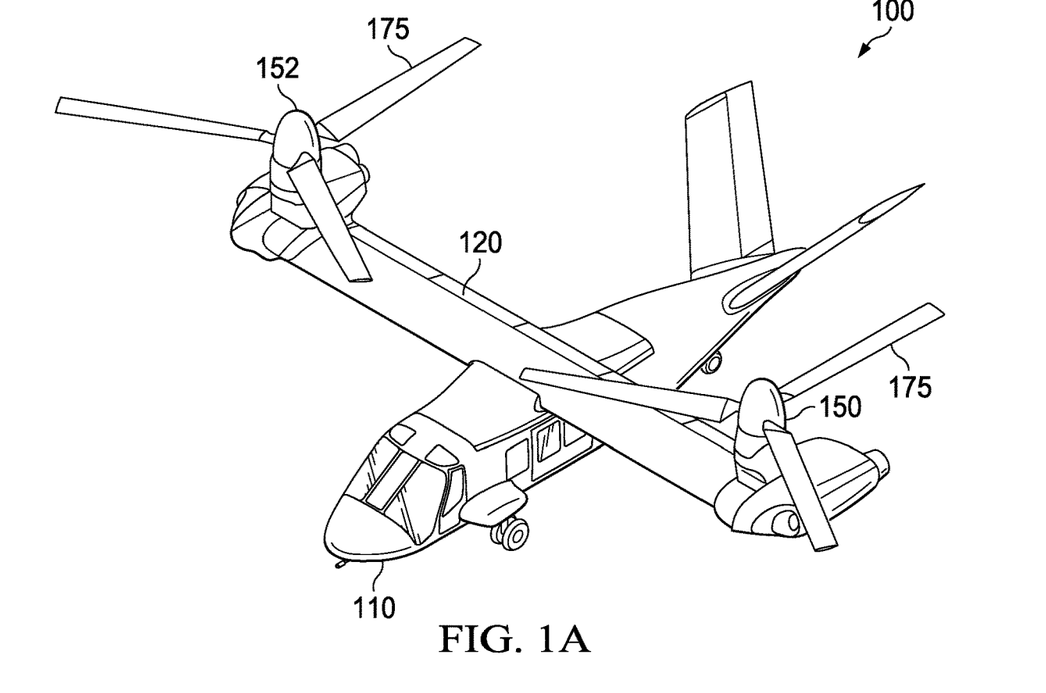
FIGS. 1A-1B are diagrams of tilt rotor aircraft.
Figure 1B:
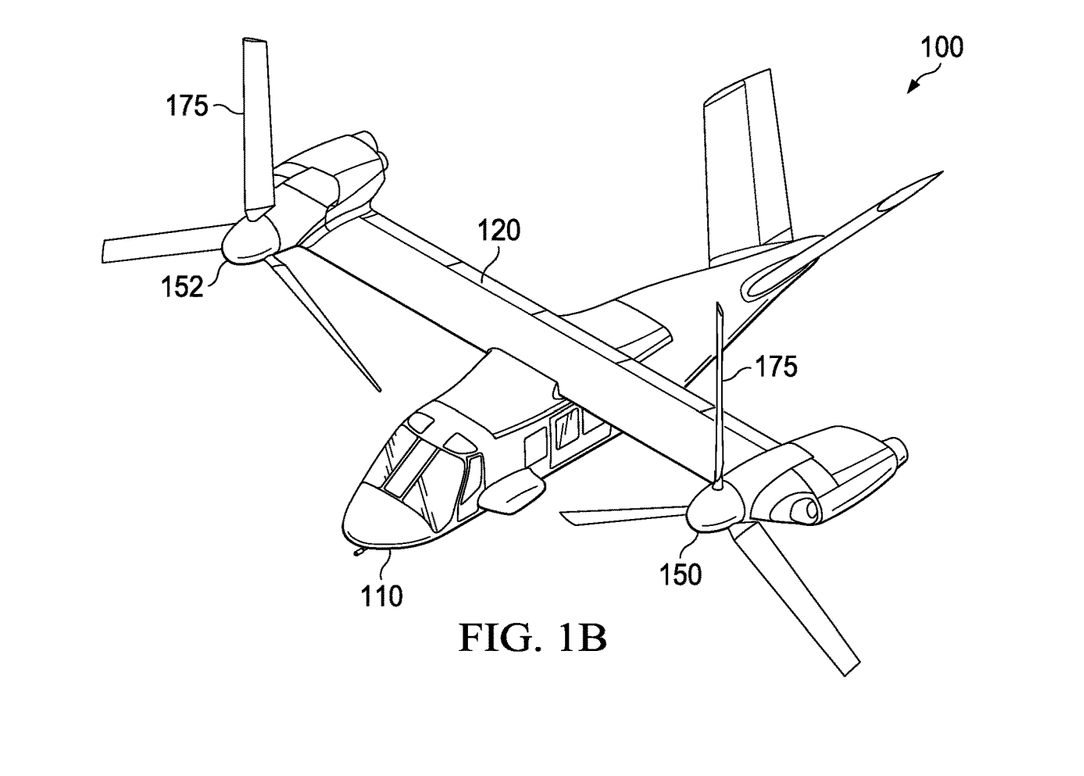

Referring now to FIGS. 1A and 1B, a typical tilt rotor aircraft 100 can be seen. FIG. 1A shows the tilt rotor 100 at takeoff or landing, with rotors 150, 152 vertically oriented. Tilt rotor 100 also comprises fuselage 110 and wings 120. In FIG. 1B, during flight, the rotors 150, 152 are horizontally oriented for forward propulsion. As the rotors 150 spin blades 175 there is significant aerodynamic interaction when blades 175 are passing in front of the wings 120. The acoustic pressure waves constructively interfere between the port 150 and starboard 152 rotors creating a louder noise for far-field observers.

Figure 2:
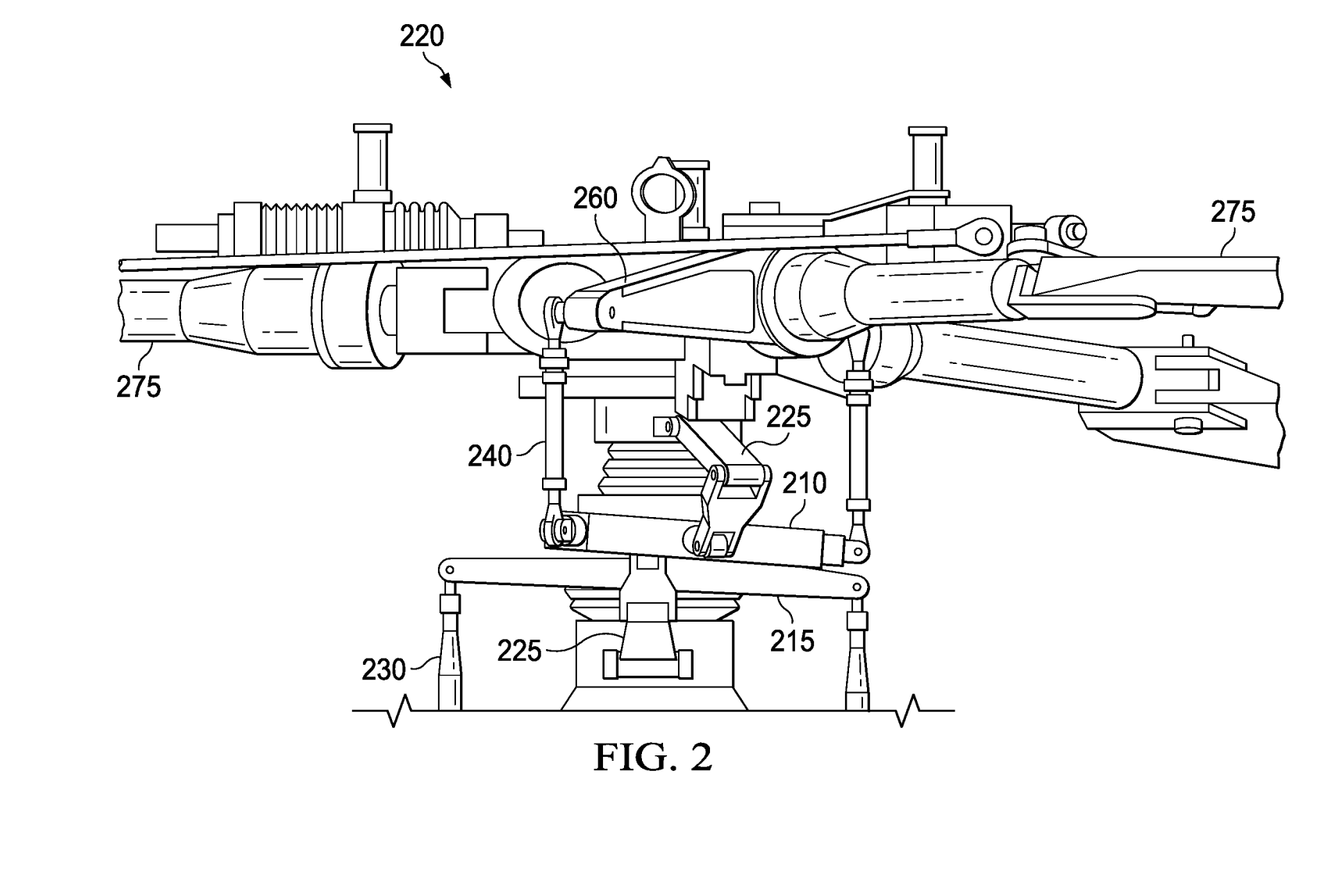
FIG. 2 is a diagram of a rotor apparatus.

FIG. 2 displays an embodiment of swashplates and related components on a rotor for a tilt rotor aircraft, such as in FIGS. 1A-1B. Rotor 220 extends from a wing of a tilt rotor aircraft. Stationary swashplate 215 sits below rotational swashplate 210. Control inputs 230 couple to stationary swashplate 215 and are operable to be manipulated by a pilot(s). Pitch links 240 couple the rotational swashplate 210 to pitch horns 260 and can thereby manipulate the pitch of blades 275. A single rotor 220 can comprise multiple control inputs 230. If the control input(s) 230 on one side of rotor 220 are raised or pushed forward, then the blades will be angled toward the opposite side as they spin. Because the control inputs 230 adjust the stationary swashplate 215 and the rotational swashplate 210 continues spinning, a raised control input 230 will cause a different angle of the blades 275 for as long as the control input 230 is so manipulated. The pitch angles of each individual blade 275 can be adjusted by the pitch links 240. Control inputs 230 can be mechanically linked back to the pilot control or a hydraulic/electronic or other actuator that is controlled digitally. There are typically 1-3 control inputs 230 around a swashplate that move it up and down to adjust the angle. These control inputs are preferably free to tilt all over, so they preferably do not transfer torque to the swashplate to keep it at a stationary azimuth around the mast. The scissor links 225 can help to keep the whole "stationary" side of the swashplate from spinning with the rotor (or for the upper set to keep the rotating swashplate from staying still and not rotating with the mast, because the pitch links also preferably do not apply a torque).

Figure 3:
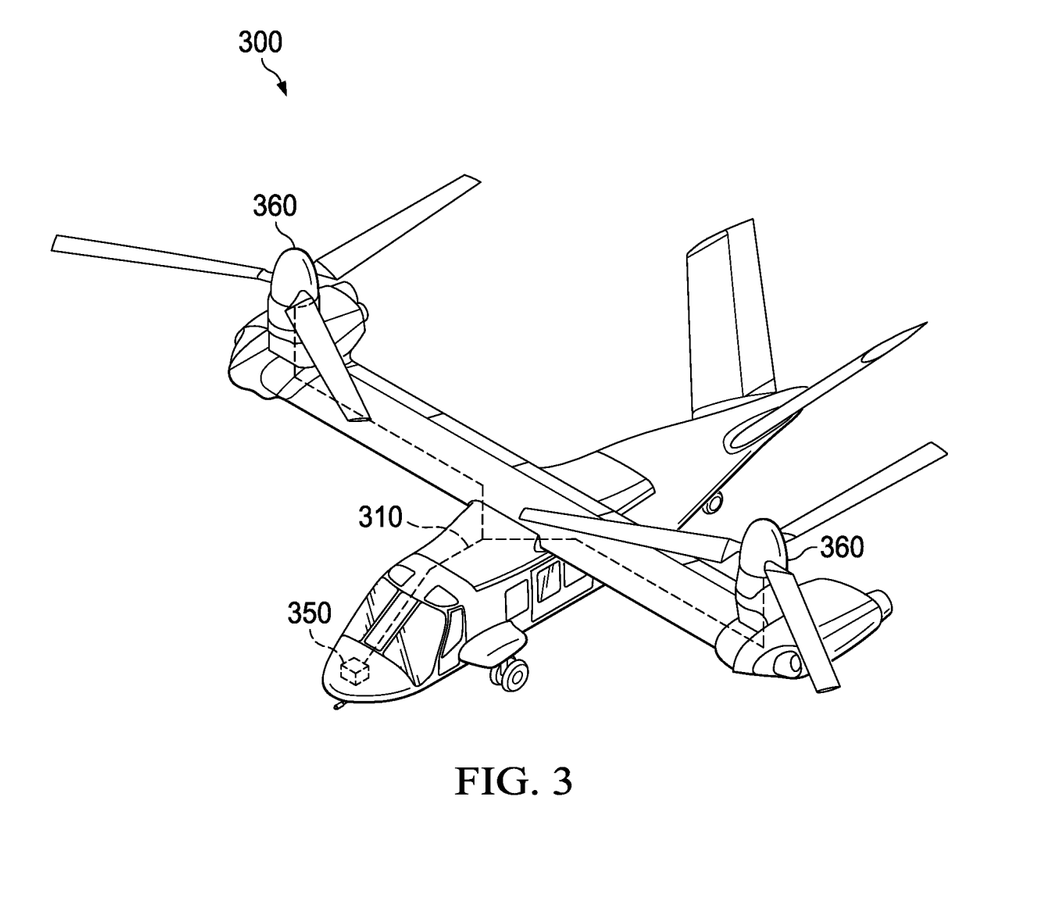
FIG. 3 is a diagram of a tilt rotor aircraft.

The control inputs 230, scissor links 225, and pitch links 240 can all be manipulated by a pilot and/or control system. An embodiment of a tilt rotor aircraft 300 with a control system 350 is shown in FIG. 3. Connection 310 provides communicative coupling between control system 350 and rotor apparatus 360. Rotor apparatus 360 can comprise various components shown in FIG. 2, such as control inputs 230, scissor links 225, and pitch links 240. Control system 350 can allow a pilot(s) to control various components of the tilt rotor aircraft 300. Other embodiments can comprise other means of adjusting pitch angle of blades 275 or rotor apparatus 360.

Embodiments under the present disclosure include techniques for increasing the distance between blades and wings and other aircraft components, so as to create less aerodynamic and acoustic interference. This can include adjusting an angle of the blades or rotors, allowing blades to flap, and other techniques. In many helicopters, it is the swashplates that can adjust the out-of-plane angle of rotation of the rotor and blades, as well as the pitch of the blades, and the forward displacement of the blades. But depending on the specific helicopter, other components may be used to accomplish these ends. In some situations, as described below, aircraft and wings can be designed or manufactured differently so as to increase the clearance between the blades and the wings or fuselage.

One embodiment under the present disclosure comprises a control system for a tilt rotor aircraft capable of minimizing the sound of the blades as they interfere aerodynamically with the wings and or fuselage. One way of achieving this is to allow the blades to flap while the tilt rotor aircraft is in cruise. Allowing the blades to flap comprises allowing the out-of-plane angle of the blades to vary, or flap, during flight. The applicant has found that allowing the blades to flap results in a reduction in the magnitude and rate at which the blade loads increase and decrease while rotating. This results in lower loading noise. Flapping in some helicopters is accomplished by allowing the blades to rotate on a hinge that allows the angle of the blades to vary, resulting in flapping. In some embodiments, the swashplate can change the blade pitch which in turn flaps the blades up and down around each revolution.

Figure 4A:
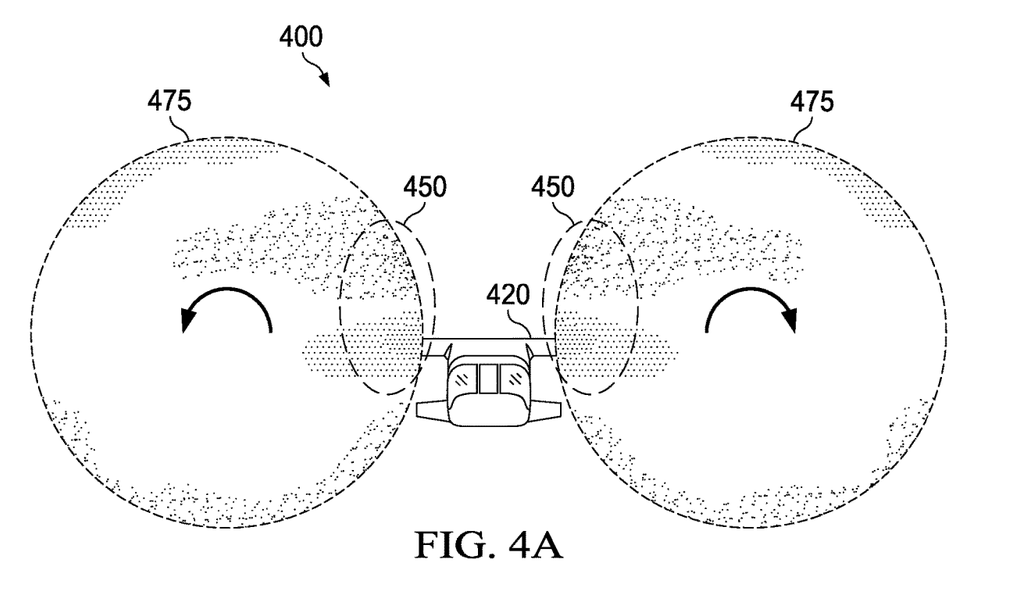
FIGS. 4A-4B are diagrams of noise level behavior for multi-rotor aircraft.
Figure 4B:
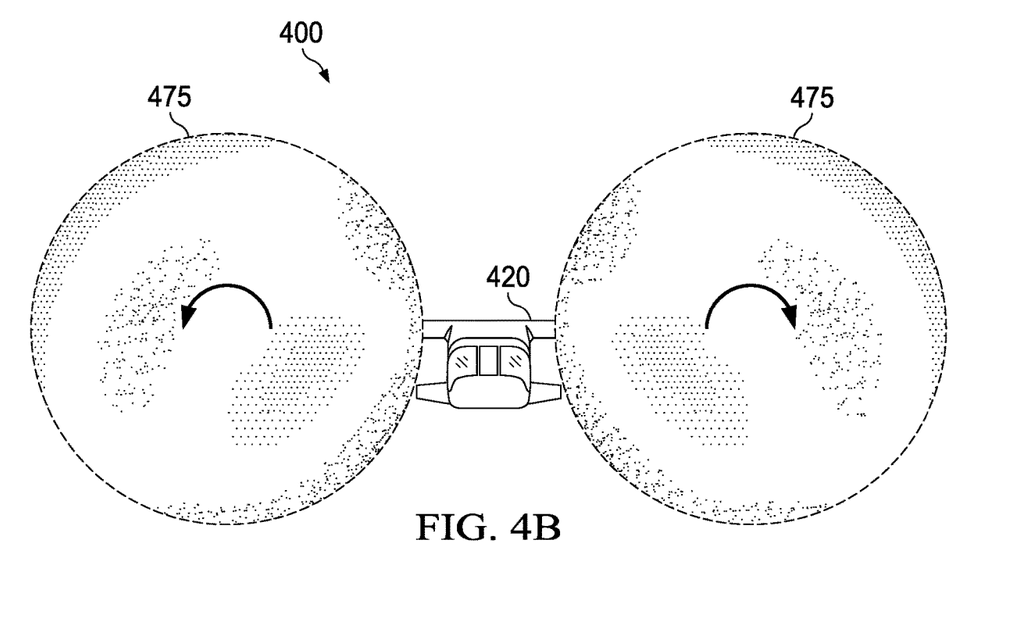

FIGS. 4A and 4B show a graphical representation of the present teachings in use. As tilt rotor aircraft 400 is in flight, blades 475 spin. The shading of the blade path represents the rate of change of force measured during flight or forward thrust. In FIG. 4A, the present teachings are not implemented. As a result, as the blades pass wings 420 at 450, greater rates of change of force are seen, and loud noises result. The greater rate of change is indicated by the more darkly shaded portions. In FIG. 4B, in contrast, the blades 475 have been allowed to flap. There is less shading where the blades 475 pass the wings 420, showing that noise has been reduced. Flapping the blades 475 allows the blades to react to aerodynamic changes. So as the blades pass the wings they can move with aerodynamic interference, instead of staying on a level plane, in a sense, fighting the aerodynamic changes.

Figure 5:
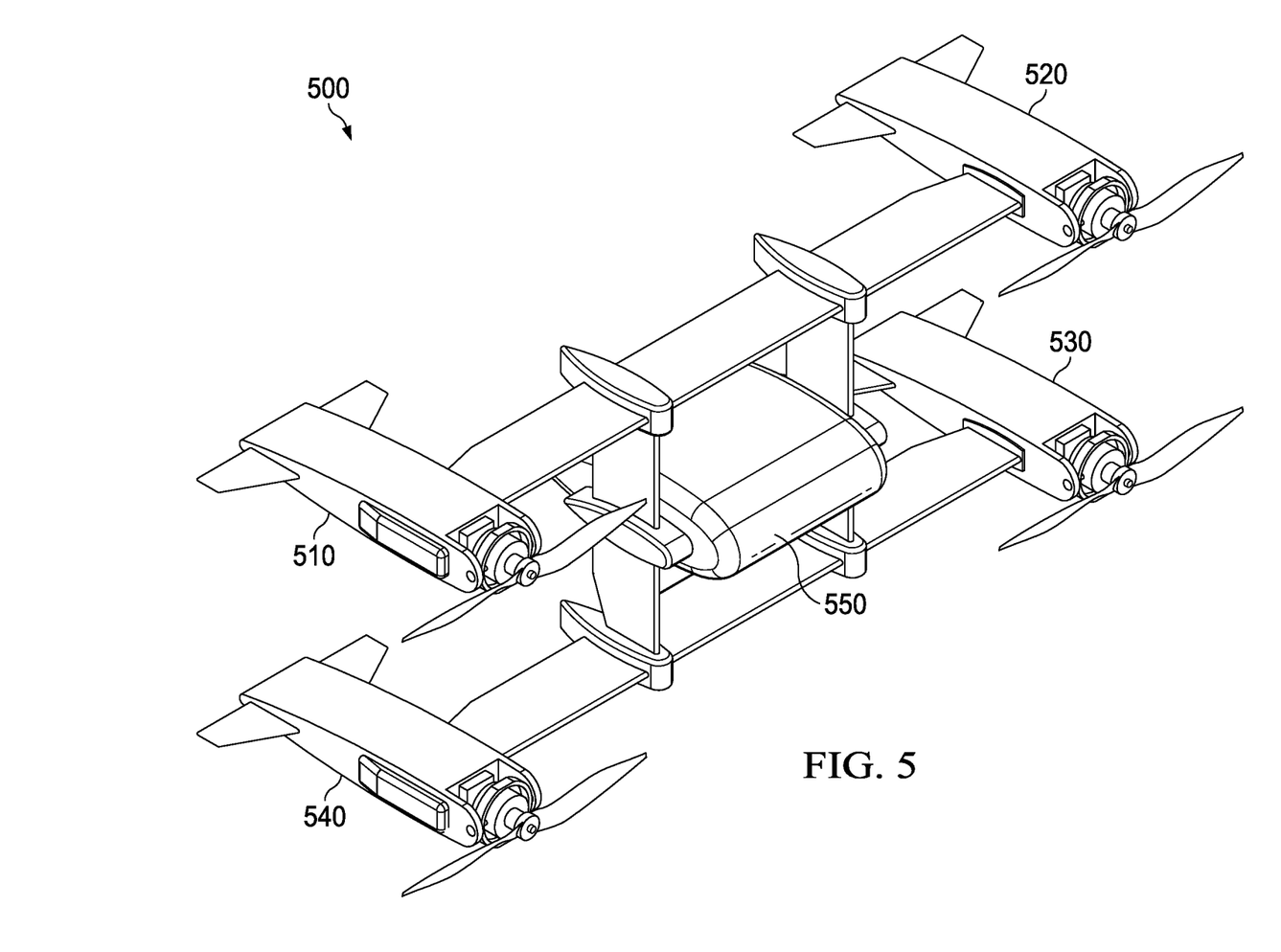
FIG. 5 is a diagram of a multi-rotor aircraft.
Figure 6:
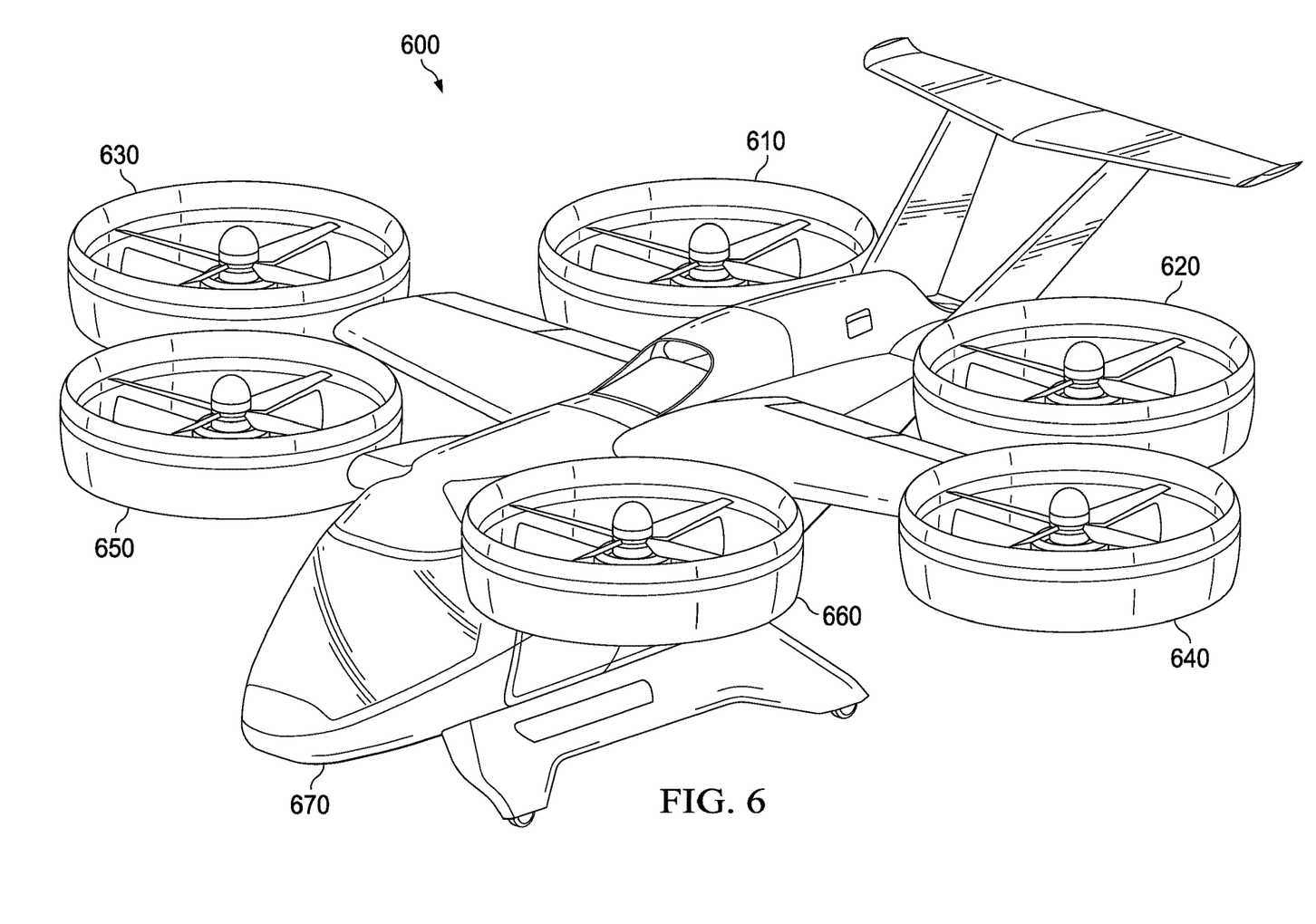
FIG. 6 is a diagram of a multi-rotor aircraft.

Embodiments under the present disclosure can include various types of aircraft with multiple rotors. Examples are shown in FIGS. 5 and 6. FIG. 5 shows an embodiment of an electrical aircraft 500 comprising four rotors 510-540. Fuselage 550 is coupled to each rotor 510-540. Electrical aircraft 500 can comprise a drone or a passenger aircraft. Each rotor 510-540 can comprise a rotor apparatus with swashplates, such as described in FIG. 2. FIG. 6 shows an embodiment of an air taxi 600, with six tilt rotors 610-660. Fuselage 670 is coupled to all rotors 610-660 and can carry passengers or cargo. Each rotor 610-660 can comprise a rotor apparatus with swashplates, pitch links and other components such as shown in FIG. 2. Aircraft 500 and 600 can comprise control systems such as described herein.

The current disclosure can be implemented in a variety of multi-rotor and/or tilt rotor aircraft. In some multi-rotor embodiments, some rotors may be inboard of other rotors. It may be desired, in such embodiments, to only allow some blades to flap, whether outboard or inboard, fore or aft.

Figure 7:
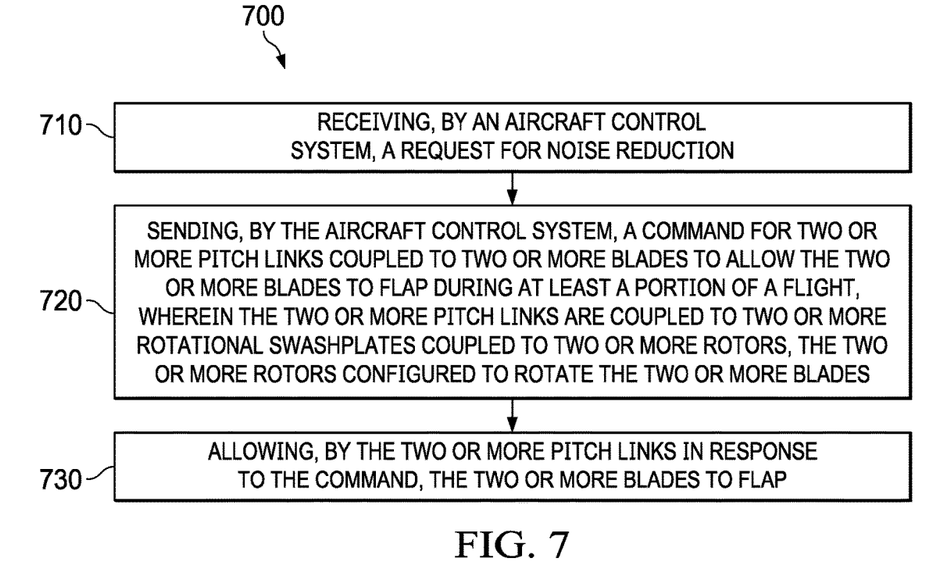
FIG. 7 is a diagram of a method embodiment.

One method embodiment under the present disclosure includes a method of controlling a multi-rotor aircraft, 700, shown in FIG. 7. Step 710 is receiving, by an aircraft control system, a request for noise reduction. Step 720 is sending, by the aircraft control system, a command for two or more pitch links coupled to two or more blades to allow the two or more blades to flap during at least a portion of a flight, wherein the two or more pitch links are coupled to two or more rotational swashplates coupled to two or more rotors, the two or more rotors configured to rotate the two or more blades. Step 730 is allowing, by the two or more pitch links in response to the command, the two or more blades to flap.

Figure 8:
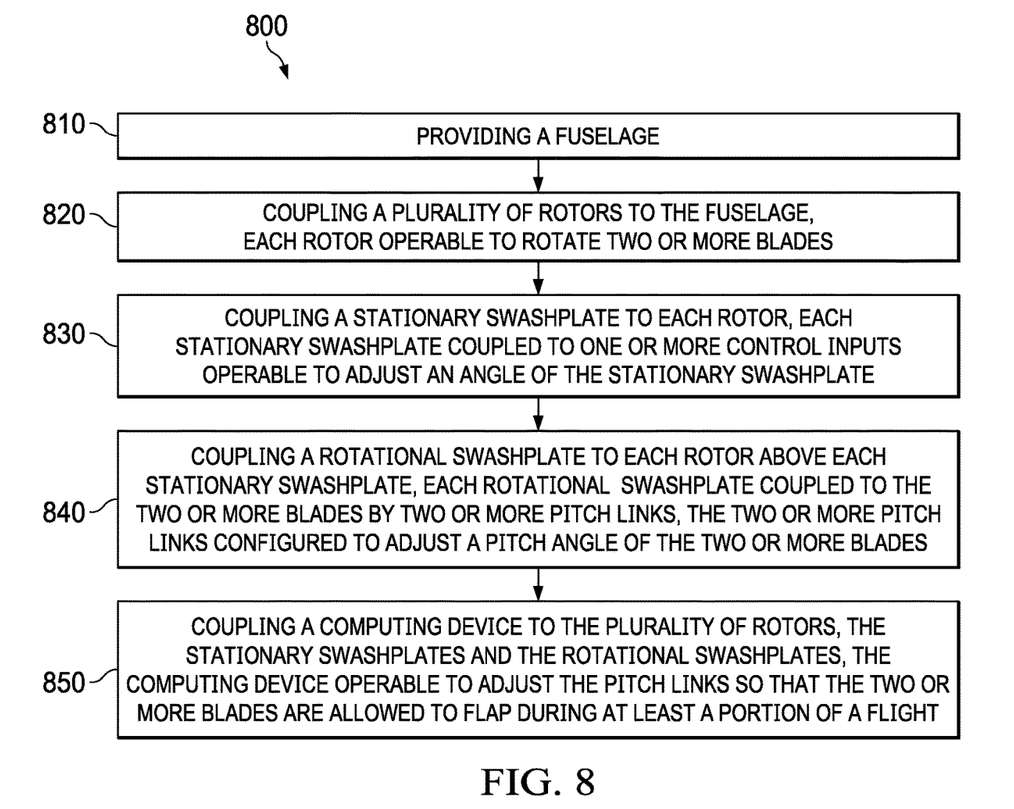
FIG. 8 is a diagram of a method embodiment.

Another method embodiment is a method of constructing an aircraft 800, shown in FIG. 8. Step 810 is providing a fuselage. Step 820 is coupling a plurality of rotors to the fuselage, each rotor operable to rotate two or more blades. Step 830 is coupling a stationary swashplate to each rotor, each stationary swashplate coupled to one or more control inputs operable to adjust an angle of the stationary swashplate. Step 840 is coupling a rotational swashplate to each rotor above each stationary swashplate, each rotational swashplate coupled to the two or more blades by two or more pitch links, the two or more pitch links configured to adjust a pitch angle of the two or more blades. Step 850 is coupling a computing device to the plurality of rotors, the stationary swashplates and the rotational swashplates, the computing device operable to adjust the pitch links so that the two or more blades are allowed to flap during at least a portion of a flight.

Further embodiments for achieving lowered noise levels under the present disclosure include sweeping wings forward, canting out-of-plane angles of spinning rotors/blades, and extending rotors longitudinally forward. These means allow a greater distance between blades and wings or other fuselage components, thus resulting in lower noise levels.

Figure 9:
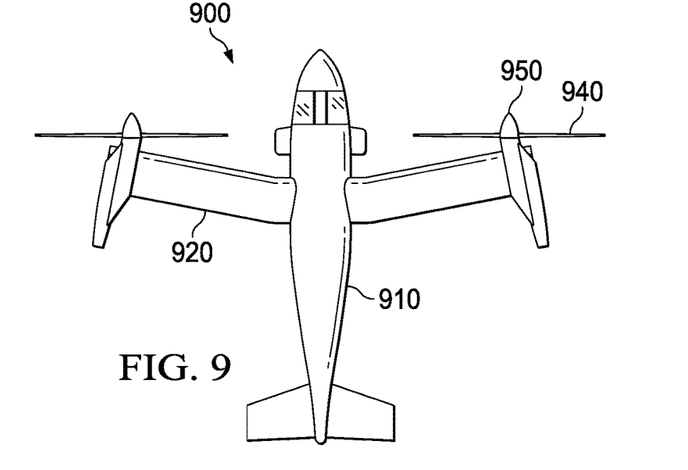
FIG. 9 is a diagram of a multi-rotor aircraft.

FIG. 9 shows an embodiment of wing sweep in an aircraft 900. Aircraft 900 can be a tilt rotor aircraft, or another type of aircraft. Fuselage 900 is coupled to wings 920. Rotors 950 on wings 920 rotate blades 940. By sweeping wings 920 forward more distance is created between blades 940 and wings 920 when blades 940 are in rotation. This creates less aerodynamic interference and less noise.

Figure 10:
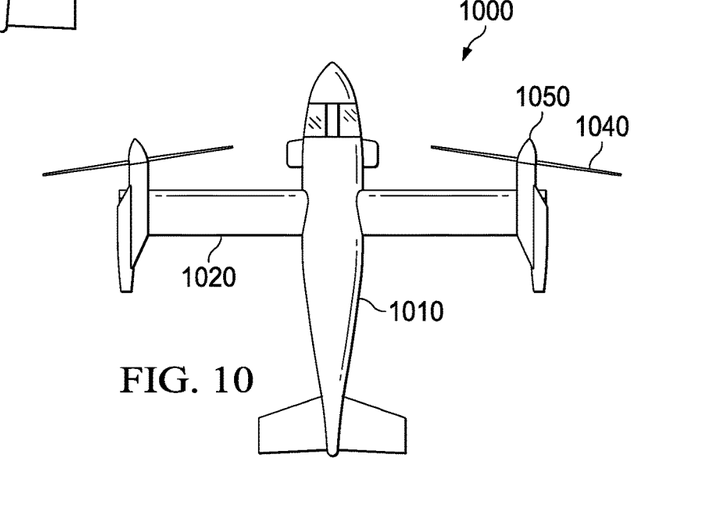
FIG. 10 is a diagram of a multi-rotor aircraft.

FIG. 10 shows an embodiment of canted blades or rotors in an aircraft 1000. Aircraft 1000 can be a tilt rotor aircraft or another type of aircraft. Fuselage 1000 is coupled to wings 1020. Rotors 1050 rotate blades 1040. Aircraft 1000 can comprise a stationary swashplate, not shown, such as in FIG. 2. Control inputs (not shown) coupled to the stationary swashplate can adjust an out-of-plane angle at which the rotor and/or blades spin, resulting in the canting shown in FIG. 10. Some aircraft embodiments may utilize other means than a stationary swashplate and control inputs to achieve various out-of-plane angles. In FIG. 10, the canting results in greater distance between blades 1040 and wings 1020 when blades 1040 are in rotation. This creates less aerodynamic interference and less noise. The embodiment of FIG. 10, with canted blades, can achieve noise reduction without flapping of blades. In this embodiment a helicopter would not need a swashplate or control system at all.

Figure 11:
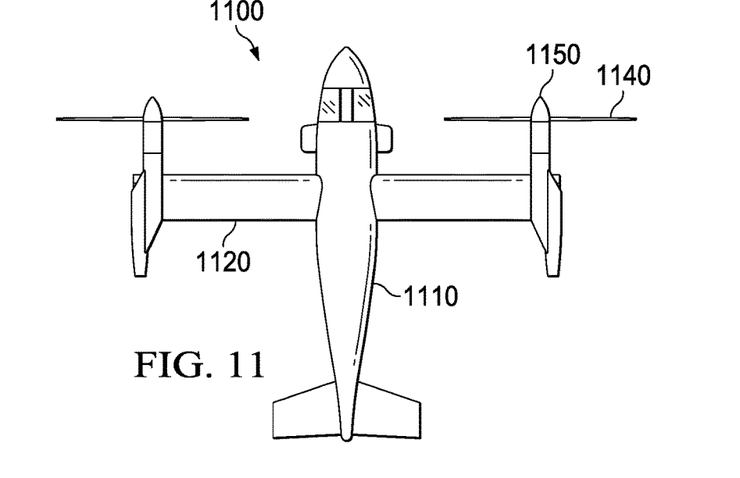
FIG. 11 is a diagram of a multi-rotor aircraft.

FIG. 11 shows an embodiment of forward shifted blades in an aircraft 1100. Aircraft 1100 can be a tilt rotor aircraft or another type of aircraft. Fuselage 1100 is coupled to wings 1120. Rotors 1150 rotate blades 1140. Aircraft 1100 can comprise a stationary swashplate and rotational swashplate, not shown, such as in FIG. 2. An aircraft 1100 can be manufactured with forwardly extending rotors 1150, resulting in the forward shift shown in FIG. 11. In FIG. 11, the forward shift results in greater distance between blades 1140 and wings 1120 when blades 1140 are in rotation. This creates less aerodynamic interference and less noise.

The sweeping, canting, and forward shifting of FIGS. 9, 10 and 11 can be combined in single embodiments, or combined however a user prefers. Furthermore, these techniques can be combined with the blade flapping described above, such as in regard to FIG. 2.

Figure 12:
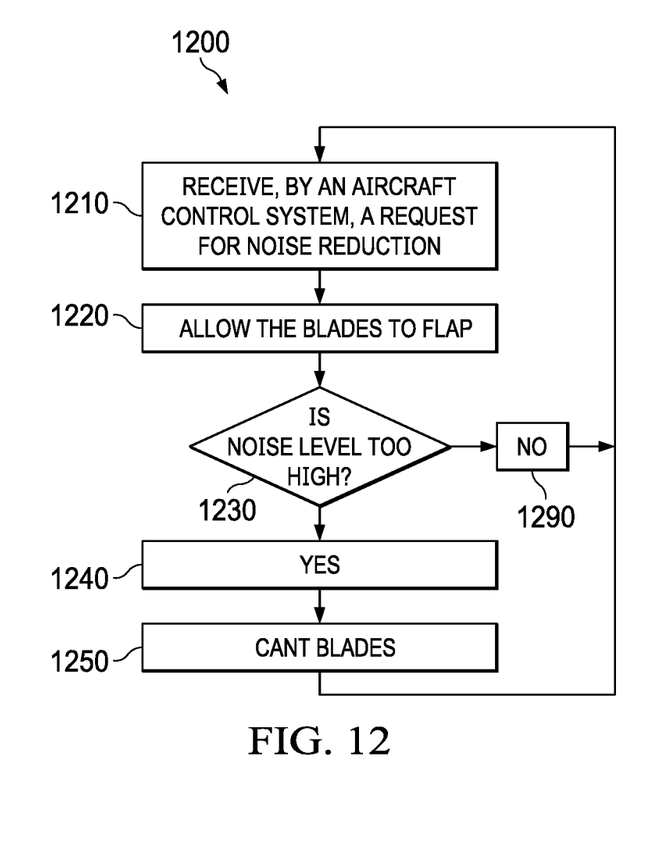
FIG. 12 is a diagram of a method embodiment.

FIG. 12 shows a possible method embodiment under the present disclosure. Method 1200 is an algorithm for controlling a multi-rotor aircraft. At 1210, a request for noise reduction is received. At 1220, the blades are allowed to flap. At 1230, if noise is still high, the process goes to 1250 and the blades are canted, such as by adjusting the stationary swashplates. The process then returns and waits for another request. If at step 1230 the noise levels are not too high, then at 1290 the process returns to wait for another request.

Figure 13:
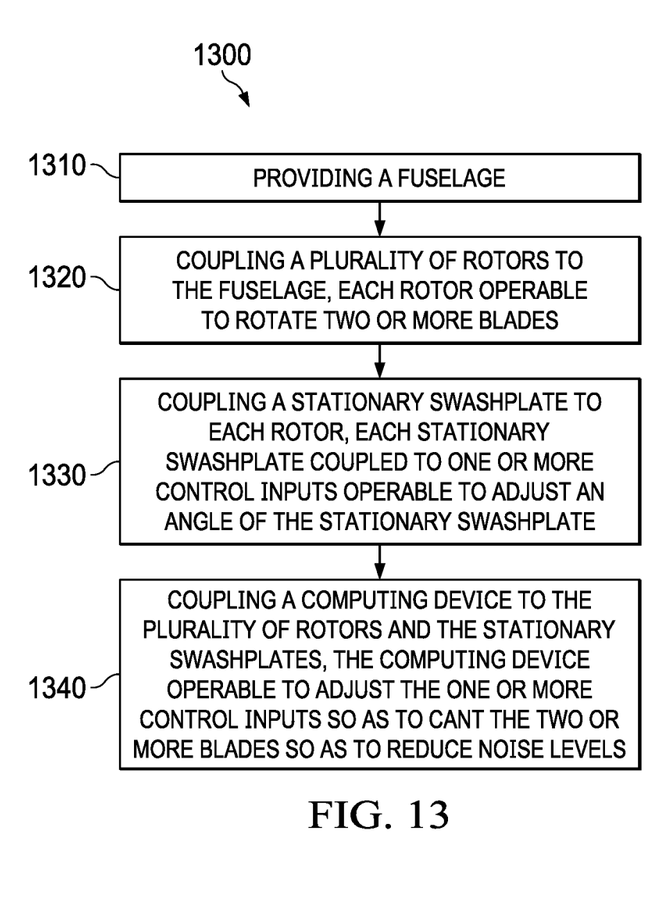
FIG. 13 is a diagram of a method embodiment.

FIG. 13 shows another possible method embodiment under the present disclosure. In method 1300 for constructing an aircraft, step 1310 is providing a fuselage. Step 1320 is coupling a plurality of rotors to the fuselage, each rotor operable to rotate two or more blades. Step 1330 is coupling a stationary swashplate to each rotor, each stationary swashplate coupled to one or more control inputs operable to adjust an angle of the stationary swashplate. Step 1340 is coupling a computing device to the plurality of rotors and the stationary swashplates, the computing device operable to adjust the one or more control inputs so as to cant the two or more blades so as to reduce noise levels.

Figure 14:
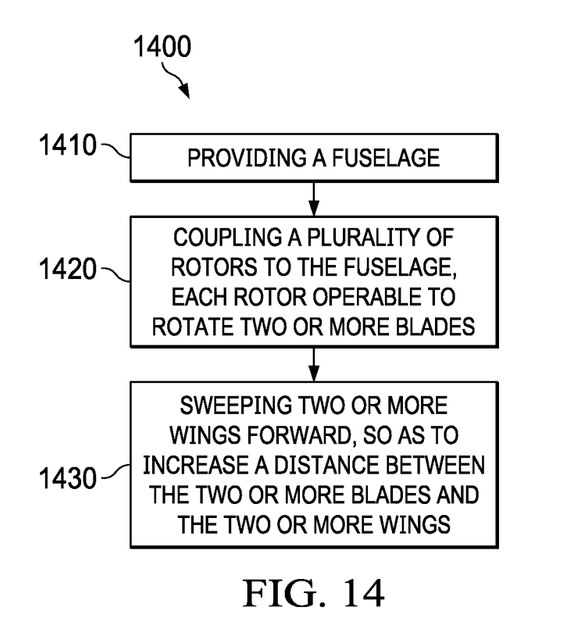
FIG. 14 is a diagram of a method embodiment.

FIG. 14 shows another possible method embodiment 1400 for constructing an aircraft under the present disclosure. Step 1410 is providing a fuselage. Step 1420 is coupling a plurality of rotors to the fuselage, each rotor operable to rotate two or more blades. Step 1430 is sweeping two or more wings forward, so as to increase a distance between the two or more blades and the two or more wings.

Figure 15:
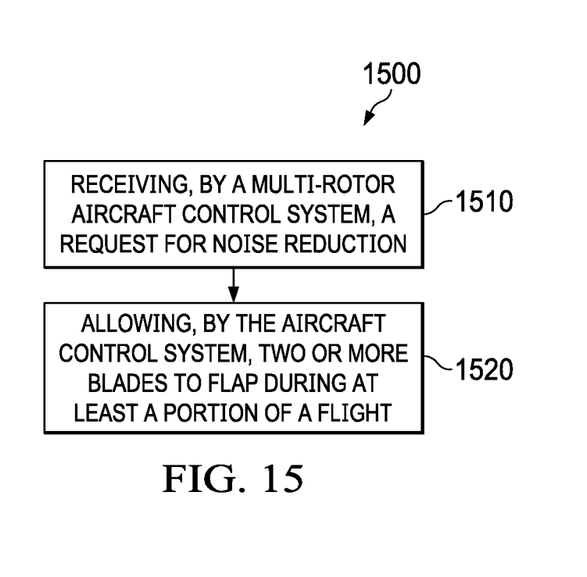
FIG. 15 is a diagram of a method embodiment.

FIG. 15 shows another possible method embodiment 1500 for controlling a multi-rotor aircraft under the present disclosure. Step 1510 is receiving, by an aircraft control system, a request for noise reduction. Step 1520 is allowing, by the aircraft control system, two or more blades to flap during at least a portion of a flight.

Any of the method embodiments described can be combined. For example, a multi-rotor aircraft with swept wings can also utilize canting, flapping, and forward wing extension, and so forth. While the swashplate can be necessary in some embodiments to allow flapping, other techniques discussed can be implemented on rotors without swashplates. For example, sweeping the wings, canting the rotors, and longitudinally extending the mast of the rotors forward can be done on rotor systems that include a swashplate mechanism but do not require a swashplate to allow these changes. Some of these techniques can be applied at the stage of constructing or designing the aircraft.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A control system for a tilt rotor aircraft, comprising:
   two or more rotors each configured to rotate two or more blades;
   a stationary swashplate on each of the two or more rotors, the stationary swashplate coupled to two or more control inputs and configured to be stationary relative to the two or more rotors, the two or more control inputs operable to adjust an angle of the stationary swashplate;
   a rotational swashplate on each of the two or more rotors and located above the stationary swashplate, each rotational swashplate coupled to the two or more blades by two or more pitch links, each rotational swashplate configured to rotate with the two or more rotors, the two or more pitch links configured to adjust a pitch angle of the two or more blades; and
   a computing device operable to receive input from one or more users, to manipulate the two or more control inputs and to manipulate the two or more pitch links to allow the two or more blades to flap during at least a portion of a flight, the computing device further operable to manipulate the two or more control inputs to simultaneously cant the two or more blades of each of the two or more rotors away from a fuselage comprising the tilt rotor aircraft so as to increase a distance between the two or more blades and the fuselage.

2. The control system of claim 1 wherein the stationary swashplate is operable to cant the two or more rotors and the computing device is further configured to adjust the canting of the two or more rotors in response to input from the one or more users.

3. The control system of claim 1 further comprising a scissor link coupled to each rotational swashplate.

4. The control system of claim 1 wherein the computing device is operable to cant the two or more rotors and to allow the two or more blades to flap at the same time.

5. The control system of claim 1 wherein each of the two or more pitch links are coupled to the two or more blades by a pitch horn.

6. The control system of claim 1 wherein the computing device comprises a flight control system of the tilt rotor aircraft control system.

7. The control system of claim 1 wherein the computing device is operable to manipulate the two or more pitch links to allow the two or more blades to flap while the tilt rotor aircraft is in cruise mode.

8. The control system of claim 1 wherein the computing device is operable to allow the two or more blades to flap without user input during a flight.

9. A multi-rotor aircraft comprising:
a fuselage;
two or more rotors coupled to the fuselage;
two or more blades coupled to each rotor and configured to be rotated by the two or more rotors;
a stationary swashplate on each of the two or more rotors, the stationary swashplate coupled to two or more control inputs and configured to be stationary relative to the rotation of the two or more rotors, the two or more control inputs operable to adjust an angle of the stationary swashplate and thereby adjust an out-of-plane angle of the two or more blades;
a rotational swashplate on each of the two or more rotors located above the stationary swashplate, each rotational swashplate coupled to the two or more blades by two or more pitch links, each rotational swashplate configured to rotate with the two or more blades, the two or more pitch links configured to adjust a pitch angle of the two or more blades; and
a computing device operable to receive input from one or more users, to manipulate the two or more control inputs and to manipulate the two or more pitch links to allow the two or more blades to flap during at least a portion of a flight, the computing device further operable to manipulate the two or more control inputs to simultaneously cant the two or more blades of each of the two or more rotors away from a fuselage comprising the tilt rotor aircraft so as to increase a distance between the two or more blades and the fuselage.

10. The multi-rotor aircraft of claim 9 wherein the multi-rotor aircraft comprises a tilt rotor aircraft.

11. The multi-rotor aircraft of claim 9 wherein the multi-rotor aircraft comprises four rotors.

12. The multi-rotor aircraft of claim 9 wherein the multi-rotor aircraft comprises six rotors.

13. The multi-rotor aircraft of claim 9 wherein the computing device is operable to receive input wirelessly from a remote user.

14. The multi-rotor aircraft of claim 9 further comprising a scissor link coupled to each stationary swashplate.

15. The multi-rotor aircraft of claim 9 further comprising a scissor link coupled to each rotational swashplate.

16. The multi-rotor aircraft of claim 9 wherein each of the two or more pitch links are coupled to the two or more blades by a pitch horn.

17. A method of controlling a multi-rotor aircraft, comprising:
receiving, by an aircraft control system, a request for noise reduction;
allowing, by the aircraft control system, two or more blades to flap during at least a portion of a flight, the two or more blades coupled to two or more rotors;
receiving, by the aircraft control system, a second request for noise reduction;
and
simultaneously canting, by the aircraft control system, the two or more blades of each of the two or more rotors away from a fuselage comprising the multi-rotor aircraft so as to increase a distance between the two or more blades and the fuselage.

18. The method of claim 17 wherein allowing the two or more blades to flap comprises manipulating one or more swashplates, each of the one or more swashplates coupled to one of the two or more rotors.

19. The method of claim 18 wherein manipulating the one or more swashplates comprises adjusting a rotational angle of the two or more rotors.

* * * * *